Patented June 12, 1923.

1,458,442

UNITED STATES PATENT OFFICE.

AUGUST SCHILLING, OF SAN FRANCISCO, CALIFORNIA.

METHOD OF STORING SALT.

No Drawing. Application filed July 11, 1921. Serial No. 483,747.

*To all whom it may concern:*

Be it known that I, AUGUST SCHILLING, a citizen of the United States, residing at the city and county of San Francisco and State of California, have invented certain new and useful Improvements in Methods of Storing Salt, of which the following is a specification.

The present invention relates to a method of storing solar salt in a saturated solution to effect a more economical medium of storage; to preserve the salt in purity, texture and volume, and to effect a more efficient distribution of time and labor in producing solar salt, with the result in economy in harvesting, purifying and shipping the same.

Very crude methods are at present employed in storing the harvested solar salt as at present carried out, and to clearly present the advantages of the present method over the methods of storing salt now in use, a brief description of the storage of solar salt as now practised is thought necessary.

Solar salt is harvested at the present time at the termination of the summer season and at a time when all other crops are harvested, necessitating the payment of high prices for labor, if the same can be obtained. The harvested salt is conveyed to a central plant for washing and after removing a portion of the washed salt, to meet anticipated demands, the remainder is stored in the open in large stacks which are subject to the action of the elements. The impurities which may have attached themselves to the stacked salt crystals through harvesting or the action of dirt blown onto the pile, are cemented, due to the exposure of the pile, to the salt crystals, and which, due to the cementing action of the impurities on the salt, renders it difficult to wash the same therefrom.

The exposed salt becomes caked and hardened and certain of it is lost due to dissolving by the fresh rain water which percolates through the stacks carrying down with it impurities which show themselves in distinct strata of discoloration within the pile and all of which impurities adhering to the crystals must be removed at great expense before the salt is adapted for sale or distribution.

The present invention has for its principal object to preserve the condition of the salt as originally harvested to maintain the included impurities contained therein at the time of harvesting in their present form, soft, nonadhering and capable of easy removal. A further object is to prevent the salt from caking or hardening, to protect the same from dilution in volume, due to the action of rain water or other fresh water, and to permit of a more efficient distribution of time and labor throughout the year, effecting a greater economy in harvesting and distributing the salt.

In carrying out my present method, the formed solar salt is harvested in any well known manner and immediately after being removed from the beds is deposited with its contained impurities adhering thereto in a receptacle of suitable size containing a saturated brine solution which preserves the impurities in a soft easily removable condition and maintains the salt in its original unit crystallized structure and prevents the same from caking or cementing itself together. The depositing of the harvested salt in the saturated brine solution obviates the necessity of the immediate washing to avoid the cementing of the impurities to the crystals and enables all available labor and efforts to become concentrated on the harvesting of the salt.

As needed, and at any time throughout the year, the salt is removed in the desired quantities from the brine solution or pickle storage; is immediately washed to remove the impurities adhering to the crystals and which have been maintained soft by the brine solution, and the purified salt is sacked or packaged for distribution, as desired.

It is apparent that the present method is equally adapted for the storage of washed or purified salt. This salt which has been purified by washing immediately after harvesting, is again perserved against deterioration by depositing into a container holding a saturated solution as in the first instance, which solution excludes all foreign matter, maintains the crystal structure, and when the demand warrants, renders the salt easily removable from the container, adapting it for ready consumption without further washing or breaking up, save for the rinsing of the brine which may be adhering to the crystals.

I claim:—

The method of storing salt produced by natural evaporation through the aid of the sun, which consists in submerging the salt immediately after harvesting and with its contained impurities into a saturated brine held within a closed space.

In testimony whereof I have signed my name to this specification.

AUGUST SCHILLING.